Dec. 8, 1959  E. A. FERGUSON, JR  2,915,874
TACTILE INDICATORS
Filed Aug. 26, 1957  2 Sheets—Sheet 1
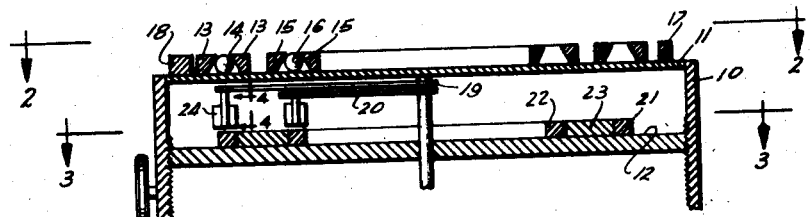
FIG. 1
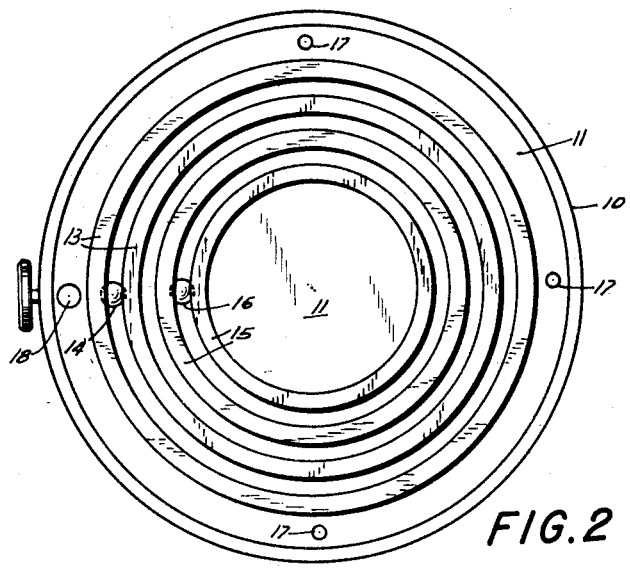
FIG. 2
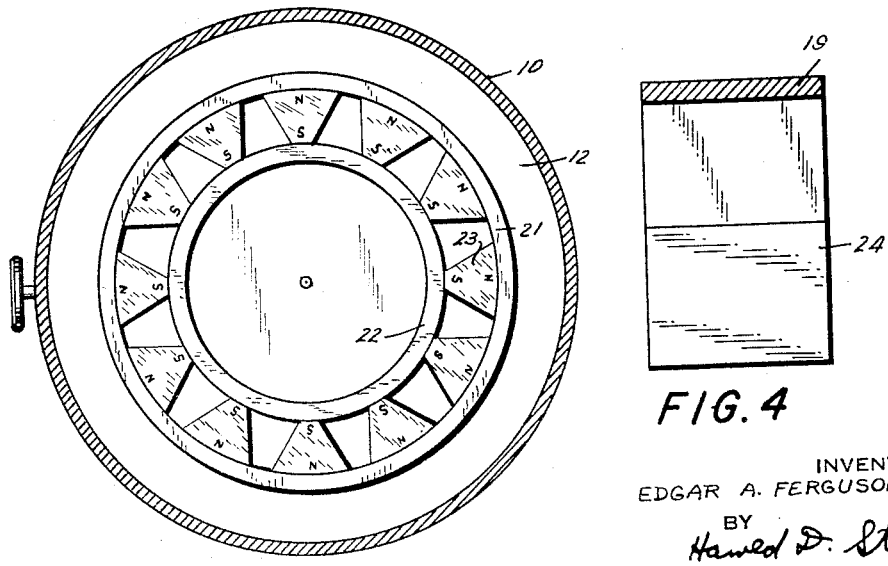
FIG. 3
FIG. 4
INVENTOR
EDGAR A. FERGUSON JR.
BY
Harold D. Steinberg
ATTORNEY Dec. 8, 1959  E. A. FERGUSON, JR  2,915,874
TACTILE INDICATORS
Filed Aug. 26, 1957  2 Sheets-Sheet 2
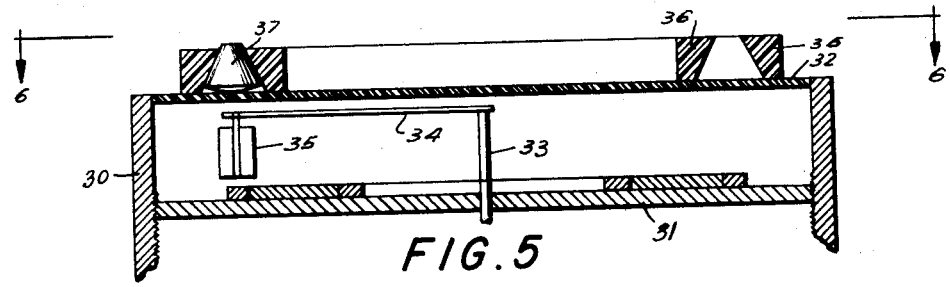
FIG.5
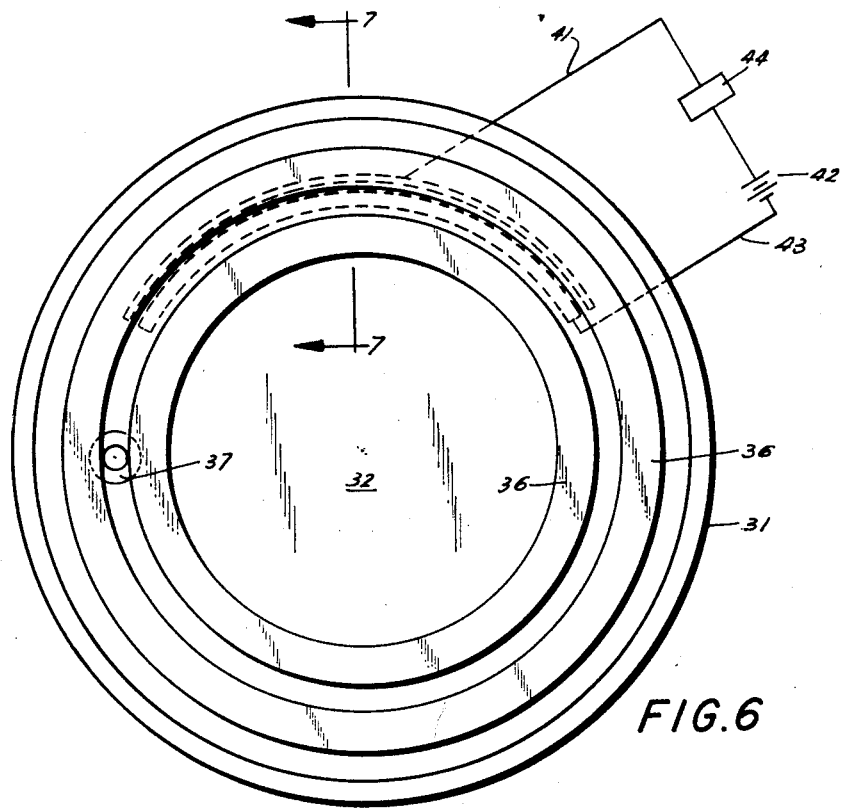
FIG.6
FIG.7
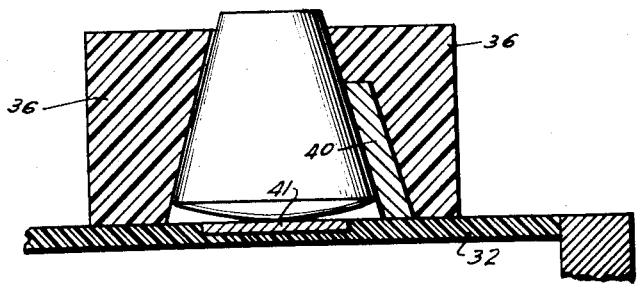
INVENTOR
EDGAR A. FERGUSON JR.
BY
ATTORNEY United States Patent Office 2,915,874
Patented Dec. 8, 1959

2,915,874

TACTILE INDICATORS

Edgar A. Ferguson, Jr., Brooklyn, N.Y.

Application August 26, 1957, Serial No. 680,354

12 Claims. (Cl. 58—126)

The present invention relates to indicators.

More particularly, the present invention relates to tactile indicators.

For people who have very poor vision or no vision, it is necessary to provide indicators, such as time indicators or motors, which will respond to the sense of touch. Although there are, at the present time, known devices for accomplishing this result, the known devices suffer from several defects. For example, in the case of a watch or the like, the user directly engages the hands of the watch to determine the time, and in so doing, the setting of the watch may be disturbed, so that the watch will not accurately indicate the time under these conditions.

One of the objects of the present invention is to provide a tactile indicator which will faithfully indicate the desired information, and which, at the same time, cannot be disturbed by the user in a manner which will give a false indication.

Another object of the present invention is to provide an indicator of the above type which is of a compact, simple construction, capable of operating reliably and having a relatively small number of parts which are easily assembled.

An additional object of the present invention is to provide a tactile time indicator capable of accomplishing the above objects.

The objects of the present invention also include the provision of a meter of any type capable of accomplishing the above objects.

Also, the objects of the present invention include the provision of a meter or the like which is capable of giving a signal when certain readings are obtained.

With the above objects in view, the present invention includes in a tactile indicator of the above type, a magnetic element and a guide means for guiding the magnetic element for movement along a predetermined first path. An indicator element is movable along a second path which is substantially identical with the first path and which is spaced substantially equidistantly at all points from the first path. A magnetic means cooperates with the indicator element for movement therewith along the second path and for magnetically moving the magnetic element along the first path so that as the indicator element moves along the second path the magnetic element will move along the first path, and the user can touch the magnetic element to determine the position of the indicator element along the second path.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary longitudinal sectional view of a time indicator constructed according to the present invention;

Fig. 2 is a top plan view of the structure of Fig. 1 along the line 2—2 of Fig. 1 in the direction of the arrows;

Fig. 3 is a sectional plan view taken along line 3—3 of Fig. 1 in the direction of the arrow;

Fig. 4 is a transverse sectional view of the minute hand of the time indicator of Fig. 1 and a magnetic director carried thereby, the section of Fig. 4 being taken along line 4—4 of Fig. 1 in the direction of the arrows;

Fig. 5 is a fragmentary longitudinal sectional view of a meter constructed according to the present invention;

Fig. 6 is a top plan view of the structure of Fig. 5 along line 6—6 of Fig. 5 in the direction of the arrows; and Fig. 7 is a transverse sectional view taken along line 7—7 of Fig. 6 in the direction of the arrows.

Referring now to the drawings, Figs. 1–4 illustrate the invention as applied to a time indicator such as a watch, for example. This tactile indicator includes a support means in the form of an outer annular housing member 10 forming part of the casing of the watch and carrying a pair of spaced parallel plates, 11 and 12, which are made of non-magnetic material, and the casing may also be made of a suitable non-magnetic material.

The plate 11 carries at its outer surface a guide means for guiding a magnetic element for movement along a predetermined path. This guide means including a pair of bearing races 13 of non-magnetic material. These races 13 are fixedly carried by the plate 11 and have frustoconical surfaces directed toward each other and converging toward each other as they approach the outer faces of the rings 13 which are directed away from the plate 11, as is evident from Fig. 1. The rings 13 define an annular space between themselves, and a magnetic element 14 in the form of a hollow ball member of soft iron, for example, is freely turnable through the annular space between the rings 13, this annular space being the path along which the magnetic element 14 is guided by the guide means 13.

An additional pair of race rings 15 identical with the rings 13 except that they are of a smaller diameter are coaxially located with respect to the rings 13 on the plate 11 in the space surrounded by the rings 13. The rings 15 form a pair of inner race rings, while the rings 13 form a pair of outer race rings, and a magnetic element 16 identical with element 14 is located in the annular space between the rings 15. The diameter of the ball members, 14 and 16, is greater than the space between the edges of the frustoconical surfaces of the pairs of rings which are nearest to each other, so that these ball members cannot fall out of the annular spaces between the race rings, but at the same time they are freely turnable therealong.

The plate 11 additionally carries at its outer surface a plurality of bosses 17 and 18. The boss 18 is of a larger diameter than the boss 17, and it will be noted that these bosses are distributed about the outermost race ring 13. The larger boss 18 indicates 12 o'clock, while the three bosses 17 indicate 3, 6 and 9 o'clock, respectively, so that by touching the bosses and by feeling the position thereof with respect to the magnetic elements 14 and 16, the user may determine the time of day, the magnetic element 14 indicating the minute and the magnetic element 16 indicating the hour.

Although the magnetic elements 14 and 16 have been described above as being in the form of hollow ball members of soft iron, it is also possible to make them solid ball members, but hollow ball members are preferred because of their lesser weight. Also it is possible to make these elements of hollow ball members having in their interior magnetic materials such as iron filings and the like.

Between the plates 11 and 12 are located the hands 19 and 20 of the timepiece, the hand 19 being the minute hand and the hand 20 being the hour hand, and these hands are turnable about a common axis which coincides with the axis of the rings 13 and 15, the manner in which these hands turn about this axis being well known and not forming a part of the present invention. A conventional clockwork turns the hands 19 and 20. These hands 19 and 20 form indicator elements which are movable at their outer end portions along paths which are identical with and spaced equidistantly from the paths defined by the pairs of race rings 13 and 15.

The plate 12 carries, at its face which is directed toward the plate 11, a permanent magnet assembly, the details of which are clearly illustrated in Fig. 3. This permanent magnet assembly includes an outer ring 21 of soft iron and an inner ring 22 of soft iron, these rings being fixed to the plate 12 and being coaxial with the race rings. A plurality of permanent magnets 23 are distributed about the turning axis of the hands 19 and 20 in the space between the rings 21 and 22, and these permanent magnets 23 extend radially with respect to the turning axis of the hands and engage the rings 21 and 22. It will be noted from Fig. 3 that the permanent magnets 23 are arranged with like poles directed toward the turning axis of the hands and the opposite like poles directed away from this axis. In the example illustrated in Fig. 3 all of the south poles are directed toward the turning axis of the hands, while all of the north poles are directed away from the turning axis of the hands. Thus, with this arrangement, as the hands 19 and 20 turn there will be no tendency for the hands to be pulled from one permanent magnet to another in a sudden manner so that the clockwork will not be aided or opposed by the magnetic force.

In accordance with the present invention, the magnetic director means are provided for directing the lines of flux from the permanent magnet assembly to the magnetic elements 14 and 16. These magnetic director means are shown in Figs. 1 and 4 taking the form of a pair of magnetic bodies 24 respectively fixed to the hands 19 and 20. Each of the magnetic bodies is made up, in the illustrated example, of three laminations with the intermediate lamination being of a larger size than the end laminations, and it will be noted that the intermediate lamination extends beyond the end laminations toward the plate 11. The intermediate lamination is fixed at its end which is located nearest to the plate 11 to one of the hands, and thus, a substantially wedge-shaped magnetic director body is provided with its larger surface located closely adjacent to the permanent magnet assembly and with its substantially pointed end located adjacent to the magnetic element. It will be noted from Fig. 1 that the outer magnetic director 24 is carried by the minute hand 19 at the face thereof which is directed toward the plate 12 with the intermediate lamination of the magnetic director 24 in alignment with the annular space between the rings 13, while the other magnetic director 24 is carried by the face of the hour hand 20 which is directed toward the plate 12 with the intermediate lamination fixed to the hand 20 having its end surface directed toward the annular space between the rings 15. The magnetic directors may be fixed to the hands 19 and 20 in any suitable way such as by gluing, riveting, screw members, welding, or the like, and the structure is shown on a relatively large scale in Fig. 1. The actual construction of the parts is not much greater than a conventional watch.

It is believed to be evident that with the above described structure, as the hands of the watch are turned by the clockwork, the ball members 14 and 16 will turn with the hands, respectively, so that by touching these ball members, the user can at all times determine the position of the hands. The magnetic director elements serve to concentrate the lines of flux on the magnetic elements 14 and 16.

With the structure of the invention, if the user should inadvertently turn the ball members 14 and 16 in their annular raceways, these ball members will simply return, due to the magnetic force, automatically back to their proper positions, and it is not possible for the user to disturb the timepiece so that it gives a false indication of the time.

Figs. 5–7 show a structure which illustrates the application of the invention to a meter. As is shown in Fig. 5 a support means including an outer casing 30 and a pair of plates 31 and 32, all made of a non-magnetic material, is provided and forms part of the housing of the meter. The plate 31 supports a pin 33 for rotation about its axis, and this pin is turned by the mechanism of the meter and carries in the space between the plates 31 and 32 the pointer 34 which also is of a non-magnetic material. Of course, in the case of the time indicator described above, the minute and hour hands are also made of a non-magnetic material. The plate 31 carries at its upper face, as viewed in Fig. 5, a permanent magnet assembly substantially identical with that illustrated in Fig. 3 and arranged coaxially with the turning axis of the pin 33, and the pointer 34 carries a magnet director means 35 identical with that described above. The outer face of the plate 32 has connected thereto a pair of non-magnetic race rings 36 identical with those described above and having their axis coinciding with the turning axis of the pin and pointer, and in the annular space between the race rings 36 is arranged a magnetic element 37 which, in the illustrated example, is a frusto-conical member which may be hollow and which is of such a size that it cannot fall out of the annular space between the rings 36. This frustoconical member may have a bottom face, as viewed in Fig. 5, which forms part of a sphere so that there will be a minimum of friction between this bottom face of this magnetic element 37 and the top face of the plate 32.

It is evident that with the above-described structure shown in Figs. 5 and 6, as the mechanism of the meter turns the pointer 34 so that its outer free end portion moves along a predetermined circular path, the magnetic director 35 will direct the lines of force from the permanent magnet assembly on the plate 31 to the magnetic element 37 so that the latter follows along the circular path defined by the rings 36 and at all times the magnetic element 37 moves with the pointer 34, so that the user need only touch the magnetic element 37 in order to determine the position of the pointer 34, and thus a reading of the meter may be taken. Suitable bosses, similar to bosses 17 and 18, may be provided for orienting element 37.

In accordance with a further feature of the invention, the non-magnetic rings and plate 32 carry electrically conductive members which cooperate with the magnetic element 37 for giving a desired signal. Of course, instead of ball members 14 and 16, frustoconical members similar to member 37 may be used in the time indicator of Figs. 1–4.

The electrically conductive members 40 and 41 are bedded in suitable recesses of the outer ring 36 and the plate 32 in the manner indicated in Figs. 6 and 7, and these electrically conductive members or strips 40 and 41 are coextensive with each other but are spaced slightly from each other. As the magnet element 37 moves along the annular space between the rings 36, it will bridge the electrically conductive elements 40 and 41 when the magnetic element 37 is located at the part of the circular path along which the elements 40 and 41 are located, and thus by engaging the elements 40 and 41 the element 37 will complete an electrical circuit which is indicated diagrammatically in Fig. 6. This electrical circuit includes in addition to the source of current 42, the leads 43 and 44 respectively connected with the electrically conducted members 41 and 40, and in addition, the circuit includes a buzzer or the like 44 which is energized upon completion of the circuit. The circuit will be complete when the magnetic element 37 bridges the elements 40 and 41 and thus when the user hears the buzzer 44, he knows that the magnetic element 37 is located at a predetermined portion of the annular path along which it moves.

It will be understood that each of the elements described above, or two or more together, may also find a useful application in other types of tactile indicators differing from the types described above.

While the invention has been illustrated and described as embodied in tactile indicators such as time indicators and meters of all types, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. In a tactile indicator, in combination, supports means; a permanent magnet assembly carried by said support means and arranged along a first path; a magnetic element located opposite the said permanent magnet assembly; guide means cooperating with said magnetic element for guiding the same for movement along a second path parallel with and substantially equidistant from the said first path; an indicator element having a portion located between said first and second paths and movable along a third path located between and substantially parallel with said first and second paths; and magnetic director means carried by said portion of said indicator element for movement therewith along said third path, said magnetic director means directing lines of magnetic flux from said permanent magnet assembly to said magnetic element for moving the latter along said second path, as said indicator element moves along said third path, whereby the user may touch said magnetic element to determine the position of said indicator element along said third path.

2. In a tactile indicator, in combination, support means including a pair of plates of non-magnetic material respectively located in substantially parallel spaced planes; a pair of coaxial race rings of non-magnetic material carried by one of said plates and respectively having a pair of frustoconical surfaces of opposite inclinations, respectively, directed toward each other and diverging from each other as they approach said one plate; a magnetic element freely turnable in the space between said race rings on said one plate and having a transverse maximum dimension greater than the distance between the edges of the frustoconical surfaces of said races which are nearest to each other so that said magnetic element is freely movable in the space between said races but cannot fall out of the space between said races; permanent magnet means carried by the other of said plates and located along a circle which is coaxial with said rings and which is of substantially the same diameter as said rings; an indicator element located between said plates and turnable between said race rings and said permanent magnet means about an axis which coincides with the axis of said rings; and magnetic director means carried by said indicator element between said plates at a radial distance from said axis substantially equal to the radius of said rings; said magnetic director means directing lines of flux from said permanent magnet means to said magnetic element so that the latter turns about said axis with said indicator element, whereby the user may touch said magnetic element to determine the angular position of said indicator element with respect to said axis.

3. In a tactile indicator, as recited in claim 2, said magnetic director means being in the form of a magnetic body having a pair of opposite ends, one of which is larger than the other, and being carried by said indicator element with the larger of the ends of said body directed toward said permanent magnet means.

4. In a tactile indicator, as recited in claim 2, said magnetic element being in the form of a ball member made of a magnetic material.

5. In a tactile indicator, as recited in claim 2, said magnetic element being in the form of a hollow ball member made of magnetic material.

6. In a tactile indicator, as recited in claim 2, said magnetic element being in the form of a frustoconical body made of magnetic material.

7. In a tactile indicator, as recited in claim 2, said magnetic director means being carried by said indicator element between the latter and said permanent magnet means.

8. In a tactile indicator, as recited in claim 2, said magnetic director means being in the form of a plurality of laminations joined to each other and having different areas with a lamination of larger area located between laminations of smaller area and ascending beyond the laminations of the smaller area toward said rings.

9. A tactile time indicator, comprising, in combination, support means including a pair of spaced substantially parallel plates made of non-magnetic material; a minute hand and an hour hand located between said plates and freely turnable about a predetermined axis normal to said plates; a pair of outer race rings carried by one of said plates at an outer face thereof, being coaxial with the turning axis of said hands, and having a radius substantially equal to that of said minute hand, said pair of outer race rings being made of a non-magnetic material and having, respectively, inner frustoconical surfaces, directed toward each other and converging toward each other as they approach the faces of said rings which are directed away from said hands; a minute indicating magnetic element freely turnable on said one plate in the space between said outer rings, and having a size which is too large to permit said magnetic element to fall out of the space between said outer rings; a pair of inner race rings of non-magnetic material carried by said one plate within said outer race rings coaxially with the latter, said inner race rings having substantially the same construction as said outer race rings, except for the diameters of said inner race rings, and said pair of inner race rings having a radius substantially equal to the length of the said hour hand; an hour indicating magnetic element of substantially the same consrtuction as said minute indicating magnetic element located in the space between said inner race rings for free movement along said space; a pair of coaxial rings of magnetic material carried by the other of said plates and having its axis coinciding with the turning axis of said hands, said rings of magnetic material respectively having diameters substantially equal to the diameters of the annular spaces between the two pairs of race rings; a plurality of permanent magnets distributed about the turning axis of said hands in the space between said magnetic rings and extending radially with respect to said axis into engagement with said rings, said permanent magnets having like poles at their ends which are directed toward said axis, respectively; and a pair of magnetic director means respectively carried by said hands adjacent to said magnetic rings for directing lines of flux therefrom to said magnetic elements, respectively, so that said minute indicating magnetic element and said hour indicating magnetic element respectively turn with said minute hand and said hour hand about the turning axis thereof to enable the user to touch said magnetic elements to determine the positions of said minute hand and said hour hand.

10. A tactile meter comprising, in combination, support means including a pair of spaced parallel plates of non-magnetic material; a pair of race rings of non-magnetic material coaxially carried by an outer surface of one of said plates and having frustoconical surfaces of opposite inclinations directed toward each other with the edges of said frustoconical surfaces which are furthest apart from each other located next to said one plate; a magnetic element freely movable along the annular space between said rings and having a size which prevents said element from falling out of the space between said rings; a permanent magnet assembly carried by the other of said plates and arranged along a circle which is coaxial with the axis of said rings; a pointer turnable about said latter axis and located between said plates, said pointer turning in response to operation of the meter; and magnetic director means carried by said pointer at substantially the same radial distance from said axis as the radius of the annular space between said rings, said magnetic director means directing lines of flux from said permanent magnet-assembly to said magnetic element.

11. A tactile meter comprising, in combination, support means including a pair of spaced parallel plates of non-magnetic material; a pair of race rings of non-magnetic material coaxially carried by an outer surface of one of said plates and having frustoconical surfaces of opposite inclination directed toward each other with the edges of said frustoconical surfaces which are furthest apart from each other located next to said one plate; a magnetic element freely movable along the annular space between said rings and having a size which prevents said element from falling out of the space between said rings; a permanent magnet assembly carried by the other of said plates and arranged along a circle which is coaxial with the axis of said rings; a pointer turnable about said latter axis and located between said plates, said pointer turning in response to operation of the meter; magnetic director means carried by said pointer at substantially the same radial distance from said axis as the radius of the annular space between said rings, said magnetic director means directing lines of flux from said permanent magnet assembly to said magnetic element; an electrical circuit including a pair of electrically conductive members respectively carried by one of said race rings and by said one plate, being substantially coextensive but spaced from each other, and being bridged by said magnetic element during at least a part of the movement thereof along the annular space between said rings, so that when said magnetic element engages said electrically conductive members, it will complete said circuit; and a signal producing device to indicate when said magnetic element is at the portion of annular space where said electrically conductive members are located.

12. In a tactile indicator, in combination, support means; a source of magnetic lines of flux carried by said support means and arranged along a first path; a magnetic element located opposite said source; guide means co-operating with said magnetic element for guiding the same for movement along a second path parallel with and substantially equal distant from this said first path; an indicator element having a portion located between the first and second paths and movable along a third path located between and substantially parallel with the first and second paths; and magnetic director means carried by said portion of said indicator element for movement therewith along said third path, said magnetic director means directing lines of magnetic flux from said source to said magnetic element for moving the latter along said second path, as said indicator element moves along said third path, whereby the user may touch said magnetic element to determine the position of said indicator element along said third path.

References Cited in the file of this patent

UNITED STATES PATENTS 298,557  Diolot _____ May 13, 1884